Jan. 8, 1957
M. L. NELSON ET AL.
2,776,570
ELECTRO-MECHANICAL ACTUATOR
Filed June 22, 1954
2 Sheets-Sheet 1
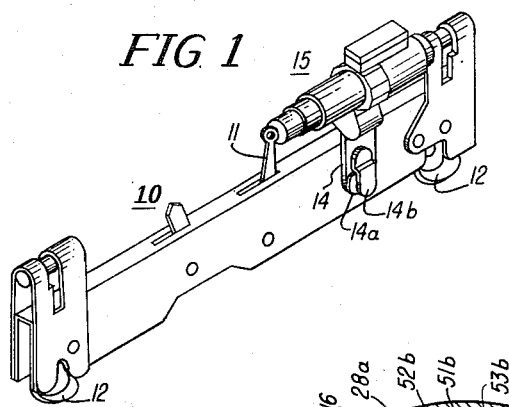
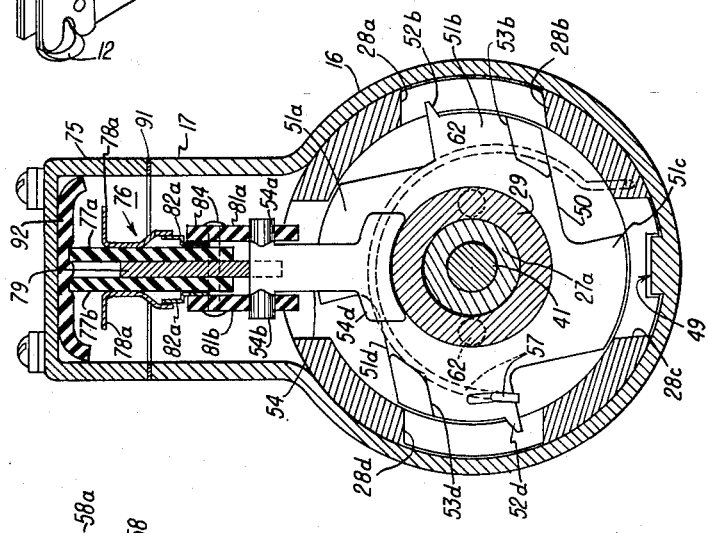
INVENTOR.
MARTIN L. NELSON
CARL J. KOPP
HANS U. HJERMSTAD
BY
ATTYS.

Jan. 8, 1957    M. L. NELSON ET AL    2,776,570
ELECTRO-MECHANICAL ACTUATOR
Filed June 22, 1954    2 Sheets-Sheet 2
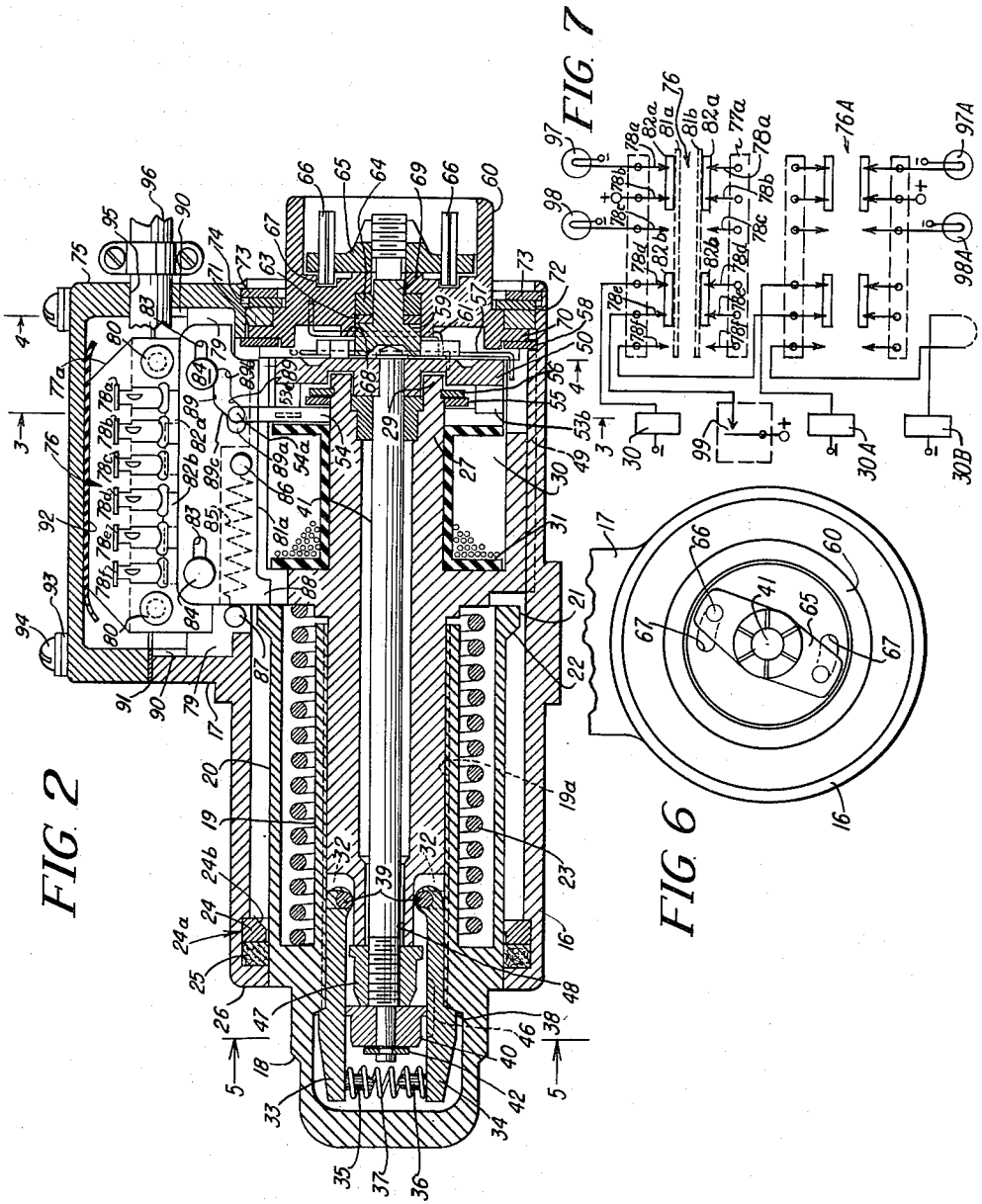
INVENTORS
MARTIN L. NELSON
CARL J. KOPP
HANS U. HJERMSTAD
BY
Smith, Olsen, Baird & Gulbrandsen
ATTYS.

United States Patent Office 2,776,570
Patented Jan. 8, 1957

2,776,570

ELECTRO-MECHANICAL ACTUATOR

Martin L. Nelson, Park Ridge, Carl J. Kopp, Arlington Heights, and Hans U. Hjermstad, Chicago, Ill., assignors to Electro-Seal Corporation, Des Plaines, Ill., a corporation of Illinois Application June 22, 1954, Serial No. 438,524

21 Claims. (Cl. 74—2)

The present invention relates to an electro-mechanical actuator mechanism and more particularly to improvements in such mechanisms for use in connection with the control of a bomb shackle release device of the type disclosed in the Schwartz et al. Patent No. 2,535,095, granted December 26, 1950.

In the prior art devices for controlling the release of bomb suspension equipment in aircraft, or the like, a spring loaded member has been held in a cocked or latched position by means of ball members that are movable between latched and unlatched positions. In the operation of the prior mechanisms, a solenoid is energized to control the ball members to move them from the latched position to the unlatched position in order to release a spring loaded ram. The spring loaded ram upon being unlatched by the ball members will, under its own spring tension, be moved to a position to the unlocked or uncocked position. Also, the prior art devices of the type noted above are provided with electrical transfer switch mechanisms whereby the circuit initially completed for energizing the solenoid of the first bomb release mechanism of the first station will be transferred to the next bomb release station after the electrical impulse for controlling the release of the first bomb release station has been interrupted.

It has been found that the prior art mechanisms, including the mechanism disclosed in the above mentioned Schwartz et al. patent, will not withstand the usual vibration and shock tests to which such mechanisms are subjected in order to meet military requirements. The extreme vibration and shock conditions to which these devices are susceptible, for example, created during acceleration of high speed aircraft, and the like, may cause inadvertent release of the bomb release mechanism.

Furthermore, vibration and shock conditions that are insufficient to cause inadvertent release of the prior mechanisms may in some instances nevertheless cause accidental closing of the transfer switch contacts in the electrical circuit, thereby inadvertently causing the completion of the circuit for releasing the succeeding bomb.

Furthermore, when the prior bomb release mechanisms have been tested to determine whether or not they will withstand severe shocks and vibrations, many of them have been rendered completely inoperative. For example, when a mechanism of the general type disclosed in the Schwartz et al. patent was given the usual vibration and shock tests, the ball members of the latching and unlatching mechanism badly scored and distorted the ball channels or guides in which they function to control the latching and unlatching operation of the bomb release mechanism. Thus, the mechanism was damaged to such an extent that it was either held in a latched position which prevented its normal release or it inadvertently released from its latched position.

It is the principal object of the present invention to provide an improved mechanism of the type described above in which the ball like members for controlling the latching and unlatching of the mechanism are entirely eliminated.

It is a further object of the invention to provide a mechanism of the type noted which is exceedingly small and compact in size and light in weight, while still providing a tremendous amount of energy or force to actuate the bomb shackle release mechanism as soon as it is released from its latched position.

It is a further object of the invention to provide a mechanism of the type noted that substantially eliminates the possibility of failure and inadvertent release when tested by the usual shock and vibration test devices.

It is a further object of the invention to provide in the mechanism of the type noted, a release device that will unlatch the cocked plunger of the mechanism in response to a predetermined movement of the release device and to utilize the movement of the plunger from a cocked position to an uncocked position to govern additional movement of the release device.

It is still another object of the present invention to provide in a mechanism of the type noted, means for actuating the mechanism from its latched position to its unlatched position either electrically or manually so that in response to the failure of the electrical system, the mechanism may be manually controlled.

Other objects and advantages of the invention will best be understood by reference to the following specification taken in connection with the accompanying drawings in which:

Fig. 1 is a perspective view of the present invention mounted in place upon a conventional bomb release shackle;

Fig. 2 is an enlarged longitudinal cross-sectional view of the present invention shown in its cocked or latched position;

Fig. 3 is a sectional view taken along line 3—3 of Fig. 2;

Fig. 4 is a fragmentary sectional view taken along line 4—4 of Fig. 2;

Fig. 5 is a sectional view taken along line 5—5 of Fig. 2;

Fig. 6 is a right end view of the mechanism of the present invention shown in Fig. 2; and Fig. 7 is a schematic wiring diagram showing the manner in which the electrical circuits are completed for sequentially controlling a plurality of mechanisms in accordance with the present invention and includes the circuits for the signal lamps to indicate the cocked or latched and the uncocked or unlatched positions of each mechanism.

Referring now to the drawings, wherein like reference characters have been utilized to designate like or corresponding parts throughout the several figures, there is shown in Fig. 1 a conventional bomb release shackle 10 having a release lever 11 and a plurality of bomb supporting hooks 12. The release mechanism 15 of the present invention is shown mounted upon the top surface of the frame of the shackle 10. This mechanism is shown in the remaining figures of the drawing except for the supporting bracket 14 which is secured to the release mechanism 15 and is provided with a spring tensioned manually operable release button 14a which, when pulled outwardly toward the stop 14b will permit the release mechanism 15 to be withdrawn from the bomb release shackle 10.

Referring now to Fig. 2 of the drawings, it will be seen that the release mechanism 15 of applicant's invention comprises a substantially cylindrical housing 16 having integrally formed therewith, an upstanding housing portion 17 for enclosing a transfer switch mechanism 76 which is demountably supported therein in the manner to be described hereinafter. Heretofore, it has been necessary, due to the extreme shock that occurs as a result of the release of the spring loaded plunger of the mechanism, to fabricate the housing 16 from stainless steel or similar hard durable material. However, in accordance with the present invention, the amount of shock that is transmitted to the housing 16 is reduced to a minimum so that the housing 16 is preferably made from aluminum or other light metals in order to further reduce the total weight of the mechanism.

A plunger 18 is slidable longitudinally in the cylindrical housing 16 and is integrally formed with an inner sleeve 19 and an outer sleeve 20. The outer sleeve 20 is provided, at its right end as seen in Fig. 2, with an enlarged ring-like member 21 having an angular circumferential stop surface 22. Between the inner and outer sleeves 19 and 20 on the plunger 18 there is provided a heavy compression spring 23, which, in the latched or cocked position of the mechanism, is compressed and tends to force the plunger 18 outwardly, to the left as seen in Fig. 2 at the instant that the mechanism is unlatched in order to drive the plunger outwardly until the angular circumferential stop surface 22 on the ring 21 engages the stop ring 24. Preferably, the spring 23 should be of sufficient size to exert a relatively high pressure over the entire length of travel of the plunger 18.

Referring now to the stop ring 24 shown at the left end of the cylindrical housing 16, it will be seen that this ring is set into a groove 24a adjacent to a felt ring 25. The stop ring 24 is a split ring, tensioned to expand outwardly, and during the period in which the device is being assembled, this split ring 24 may be compressed sufficiently to slide it into the groove 24a and then permit it to expand and lock itself in place. Both the stop ring 24 and the felt ring 25 are retained by the groove 24a against the outer shoulder 26 on the casing 16. At the end of the outward travel, the angular circumferential stop surface 22 on the outer sleeve 20 of the plunger 18 will engage an angular circumferential surface 24b on the stop ring 24 with considerable force and will cause the ring to expand slightly and possibly slide toward the felt ring 25. The combined action of the expansion of the split ring 24 outwardly in the groove 24a and the sliding action toward the felt ring 25 functions as a friction brake to bring the rapidly moving plunger 18 to a stop position. However, the stopping action is relatively gradual and thus considerably reduces the usual shock that is transmitted to the housing 16 in prior devices.

The mechanism also includes a stator or magnetic core 27 which is provided at its outer right end, as best seen in Fig. 3, with pole pieces 28a, 28b, 28c and 28d and a central pole piece 29. The central pole piece 29 of the magnetic core 27 is the magnetic core for the solenoid 30. At the left end as seen in Fig. 2, the core is provided with oppositely disposed slots 32 to receive the catch or latch members 33 and 34. Each of the latch members 33 and 34 are provided with lugs 35 and 36 respectively in order to retain the latch spring 37 in position between the respective latches 33 and 34. The latch spring 37 is a compression spring and is arranged to normally hold the latch members 33 and 34 in a separated position. Inasmuch as the latch members are each provided with the angular surface 38 that cooperate with corresponding surfaces on the inner wall of the plunger 18, the plunger will be retained in its latched position until the spring 37 is permitted to be compressed in the manner to be described hereinafter.

The latch members 33 and 34 are pivotally mounted by the pivot pins 39 at their right ends in the slots 32 provided in the magnetic core 27. Thus, the outer or left ends of the latch members 33 and 34 may pivot about the pivot pins 39.

In order to hold the latch members in the expanded position illustrated in the drawing, there is provided a cam 40 which is secured to the shaft 41 in any desired manner, for example, by means of a split spring washer 42 secured in the slot in the end of the shaft. In order to prevent rotation of the cam 40 with respect to the shaft 41 the cam may be keyed to the shaft.

By referring to Fig. 5, it will be seen that the cam 40 includes the opposite flat surfaces 43 and 44 which are arranged to cooperate with the angular cam follower surfaces 45 and 46 provided on the respective latch members 33 and 34. As long as the cam 40 is in the position illustrated in Fig. 5, the cam will hold the spaced-apart latch members 33 and 34 in the expanded positions to prevent them from compressing to release the core 18 from its illustrated latched position. If the shaft 41 is rotated in a clockwise direction as seen in Fig. 5 a short distance, the flat cam surfaces 43 and 44 will then cooperate respectively with the cam follower surfaces 45 and 46 respectively provided on the latch members 33 and 34. When this occurs, the heavy spring 23 will be effective to begin to move the plunger 18 outwardly to the left as seen in Fig. 2 against the angular surfaces 38 provided on the respective latches. This will cause the latch members to be moved toward each other against the tension of the spring 37 and due to the excessive force exerted by the heavy spring 23 in moving the plunger 18 outwardly, the cam follower surfaces 45 and 46 will be compressed against the cam surfaces 43 and 44 to such an extent that it will cause further rotation of the cam 40 and the shaft 41.

In order to retain the shaft 41 in a position that will permit the cam 40 to cooperate with the latch members 33 and 34, a stop nut 47 is provided which is threaded upon the shaft 41 and cooperates with the corresponding edge surfaces on the core 27 to retain the shaft 41 in oscillatory position in the core. At this point, it should be noted that a central opening 48 is provided in the core 27 so that the shaft 41 may be inserted therethrough. However, the central opening 48 is somewhat oval in shape in order to permit the shaft to seek its own center between the respective latch members 33 and 34 whether the cam 40 is in the position illustrated in Figs. 2 and 5 or whether it has been rotated to unlatch the latch members 33 and 34. Since the central opening 48 is oval shaped, it will prevent the shaft 41 from binding therein if it is moved vertically during the actuation of the device.

In order to prevent relative rotation between the core 27 having the central pole piece 29 on the core 27 and the external pole pieces 28a to 28d, inclusive, and the inner wall of the cylindrical housing 16, the core 27 and the housing 16 are respectively provided with cooperating longitudinal keyways 49 which are located along the lower rear or right-hand portion of the respective elements as seen in Fig. 2 and as more clearly shown in the lower portion of Fig. 3.

A rotor 50 having four circumferentially spaced-apart pole pieces 51a to 51d, inclusive, is keyed to or rigidly secured in any desired manner to the shaft 41 as seen in Fig. 2 to cooperate with the central pole piece 29 and the respective circumferentially spaced-apart pole pieces 28a to 28d, inclusive, of the magnetic core 27. In order to provide more efficient magnetic flux paths between the respective pole pieces of the rotor 50 and the respective pole pieces of the core 27, each of the pole pieces 51a and 51c is arranged so that a portion of the leading edges thereof will over-lap or extend beyond the cooperating surfaces of the stationary pole pieces 28a and 28c, as best shown in Fig. 3. Thus, when the solenoid 30 is energized in the manner to be described hereinafter and creates the magnetic flux field between the stationary pole pieces 28a to 28d, inclusive, and the pole pieces 51a to 51d, inclusive, the rotor 50 will rotate in a clockwise direction, as seen in Fig. 3, until the extensions or stops 52b and 52d respectively engage the corresponding stationary pole pieces 28b and 28d. Thus, the magnetic flux created by the energization of the solenoid 30 will first rotate the rotor 50 in the clockwise direction as described above and it will then magnetically hold the rotor 50 in its advanced rotary position by means of the stops 52b and 52d in engagement with the pole pieces 28b and 28d as long as the solenoid 30 remains in an energized condition.

In addition to the foregoing, the rotor 50 is provided with oppositely disposed lugs 53b and 53d which extend upwardly as viewed in Fig. 3 and which extend rearwardly as seen in Fig. 2. In the present invention, only the lug 53d is effective during the rotary movement of the rotor 50 in a clockwise direction as seen in Fig. 3 to cooperate with a switch keeper 54 to prevent release thereof, as will be described hereinafter, whereas the oppositely disposed lug 53b is provided to maintain the balance of the rotor 50 and to cooperate with the stop on the spool head of the coil spool 31 to limit the rotary movement of the rotor 50 in a counter-clockwise direction, as seen in Fig. 3, to the illustrated normal position.

In order to provide a bearing for the shaft 41 of the rotor 50, the right-hand end of the magnetic core 27 as seen in Fig. 2, contains a radial and thrust bearing 27a into which the shaft 41 is inserted. The face of the shoulder on the rotor 50 engages the cooperating end face of the thrust bearing 27a to prevent axial movement of the shaft 41. As seen in Fig. 3 the end of the central pole piece 29 of the magnetic core 27 extends in a complete circle and the cooperating circular slot formed in the surface of the rotor 50 is arranged so that the rotor 50 may rotate its associated shaft 41 with respect to the central pole piece 29. The manufacturing tolerances between the pole piece 29 and the cooperating annular slot in the rotor 50 are such that the rotor may freely rotate.

As previously noted, the solenoid coil 30 is wound on the coil spool 31 and the latter spool is arranged so that it will slide over the end of the central pole piece 29 of the magnetic core 27 to assume the position illustrated in Fig. 2. The coil spool 31 is preferably made from nylon but it may be manufactured from any other type insulating material. At this point it may be well to note that the switch keeper 54 illustrated in Figs. 2 and 3 extends upwardly from the central pole piece 29 to the transfer switch 76 to be described hereinafter, and parallel to the corresponding spool head of the coil spool 31. In order to permit the switch keeper 54 to be movable vertically as seen in Figs. 2 and 3, either away from or toward the central pole piece 29 and to retain the keeper 54 in the proper position, the right-hand spool head of the coil spool 31, as seen in Fig. 2, is slotted from the junction of the central pole piece 29 to its outer peripheral edge. This slot retains the keeper 54 in its allotted position during vertical movement therein.

Adjacent the keeper 54 there is provided a nylon washer 55 which is placed around the central pole piece 29 adjacent the outer right-hand surface of the spool head on the coil spool 31 and it is held in place by means of the retaining ring 56. The last-mentioned retaining ring is of the type that may be circumferentially expanded and when released will compress itself into a cooperating slot in the central pole piece 29 to lock the nylon washer 55 and the coil spool 31 and the solenoid coil 30 wound thereon in position.

Referring now to Fig. 3, it will be noted that a C-shaped spring 57 is removably secured at one end in a cooperating opening in the rotor 50 and at the other end it is removably secured in the end of the pole piece 28b. This spring is under tension so that when the rotor 50 is rotated in a clockwise direction, as seen in Fig. 3, the spring while lightly resisting such rotation, is not strong enough to prevent the stops 52b and 52d thereon from engaging the cooperating pole pieces 28b and 28d. As soon as the magnetic flux dies down between the pole pieces of the rotor 50 and the cooperating stator pole pieces, the spring 57 becomes effective to restore the rotor 50 in a counter-clockwise direction to the position illustrated in Fig. 3. There are other conditions, not described at the present time, that will cause the rotor 50 to be rotated in the counter-clockwise direction to assist the spring 57 in returning the rotor 50 to the illustrated position.

In the description thus far of the component parts of the mechanism, particular emphasis has been placed upon the fact that it is the energization of the solenoid coil 30 that causes the rotor 50 and its cooperating shaft 41 to be rotated in the clockwise direction as seen in Fig. 3. It is an additional feature of the present invention to manually control the rotary action of the rotor 50 to unlatch the mechanism.

Before describing the manual control of the release or unlatching of the mechanism, the manner in which the parts are assembled will first be discussed. The cylindrical housing 16 first receives the felt ring 25 which is placed in the groove 24a and then receives the split stop ring 24 which is held compressed in diameter. When the ring 24 is in a position to be expanded into the groove 24a, the compressed ring is released so that it may expand outwardly and set itself in the groove 24a.

Before the stator or magnetic core 27 is inserted into the central opening formed by the inner sleeve 19 on the plunger 18, the various parts supported by the core 27 must first be assembled together. Thus, the solenoid coil 30 wound upon the coil spool 31 is placed in the position shown upon the right-hand end of the core 27 with the nylon ring 55 and the retaining ring 56 holding the same in place by placing the latter ring in the cooperating slot in the circumferential well of the central pole piece 29 on the core 27. Thus, the solenoid 30 and the coil spool 31 are now held in position on the core 27. Thereafter, the rotor 50 is secured to the right end of the shaft 41, in any desired manner, and the shaft is inserted through the bearing 27a and the central opening 48 in the core so that the left end of the shaft extends beyond the left end of the central core 27. The stop nut 47 is now threaded upon the corresponding threads on the shaft 41 to hold the shaft 41 with its rotor 50 in cooperating relationship with the central pole piece 29 on the core 27. It should be understood, however, that the central pole piece and the circumferential groove formed in one end of the rotor 50 closely cooperate to provide an efficient magnetic flux path therebetween. After the stop nut 47 has been secured in the manner described above, the cam 40 will be placed upon the shaft 41 and keyed in place in a well known manner to prevent relative rotation between the shaft 41 and the cam 40. In order to prevent the cam 40 from sliding longitudinally along the shaft 41, it is retained in place by means of the split spring washer 42 which fits into a cooperating groove formed adjacent the left end of the shaft 41.

As previously described, the core 27 is provided with slots 32 in the upper and lower circumferential surfaces as best seen in Figs. 2 and 5 to respectively receive the pivot pins 39 integrally formed on the latch or catch members 33 and 34 and function to provide the pivot point about which the latch members 33 and 34 may pivot at their outer ends toward and away from one another. In order to retain the latch members in expanded position away from one another, the latch spring 37 is placed on the lugs 35 and 36 provided respectively on the two latch members 33 and 34.

After the above described parts have been assembled in the manner described, the main compression spring 23 is placed on the core 27. The rotor 50 is then turned to its trip position so that the cam 40 will be rotated sufficiently to permit the latches 33 and 34 to be pressed toward each other, by means of a tool or the like, as the core 27 and the spring 23 are inserted into the central opening formed by the inner sleeve 19 on the plunger 18. The spring 23 will be inserted into the annular opening formed in the plunger 18 between the inner sleeve 19 and the outer sleeve 20. When the plunger 18 is forced all the way onto the core 27 by compressing the spring 23, the spring 37 will force the latches 33 and 34 outwardly and the rotor 50 is then turned so that the cam 40 again holds the latches 33 and 34 in the outward position to hold the plunger 18 in its loaded or cocked position. Thereafter, the return spring 57 for the rotor 50 is assembled in place, as is best illustrated in Fig. 3, to retain the rotor 50 in its latched or cocked position.

The plunger 18 is now in condition to be inserted in place in the cylindrical housing 16. Consequently, the plunger 18 upon being inserted in the cylindrical housing 16 will be in the position shown in Fig. 2. In order to hold the plunger 18 and the cylindrical housing 16 in assembled position, the split ring washer 58 is inserted into the groove 58a formed in the inner wall of the cylindrical housing 16 and is then expanded so that it will seat itself therein to prevent the withdrawal of the core 27 and the plunger 18 from the cylindrical housing 16.

In order to provide the manual control for the rotor 50, a trip member 59 is rotatably mounted in a trip housing 60 with a C-shaped spring 61 having its ends respectively secured to the trip member 59 and the trip housing 60. It should be understood, however, that openings are provided in the trip member 59 and the trip housing 60 to dismountably receive the respective ends of the C-shaped spring 61. The spring is tensioned so that it will normally tend to rotate the trip member 59 in a counterclockwise direction, as seen in Fig. 4, so that the shoulders formed in the trip member 59 are adjacent the oppositely disposed studs 62 on the outer surface of the rotor 50. The trip member 59 although tensioned by the spring 61 in a counterclockwise direction as seen in Fig. 4 remains in the position illustrated because the trip arm 65 and the pins 66 therein are normally in engagement with one end of the slots 67 provided in the outer surface of the trip housing 60.

The trip member 59 is rotatably mounted in the trip housing 60 with the washer 63 and the sealing ring 64 therebetween, as seen in Fig. 2. The shoulder 68 on the trip member 59 serves as the bearing for the latter member in cooperation with the opening formed in the trip housing 60. Also, the extended portion of the shaft 69 on the trip member 59 cooperates as a bearing with the opening in the trip housing. The outer end of the shaft 69 on the trip member 59 is threaded into the trip arm 65 having self locking threads therein to resist the unthreading of the trip arm 65 from the corresponding threads in the shaft 69. As best seen in Fig. 2, the pins 66 are inserted into oppositely disposed openings provided in the trip arm 65 and extend sufficiently beyond the rear surface thereof to cooperate with the slots 67 in the outer surface of the trip housing 60. These slots form the stop for the pins 66 and are circumferentially arranged in the outer surface of the trip housing 60 so that the pins 66 normally engage one end of the slots, under control of the counter-clockwise tension of the C-shaped spring 61 on the trip member 59 as viewed in Fig. 4. The slots 67 extend circumferentially in the outer surface of the trip housing 60 a predetermined distance so that the trip arm 65, by means of the pins 66, can be rotated in a counter-clockwise direction as seen in Fig. 2, and in a clockwise direction as seen in Fig. 4 to rotate the trip member with the shoulders thereof in engagement with the studs 62 on the outer surface of the rotor 50 to simulate the action of the rotor under control of the magnetic flux generated by the solenoid 30 on the coil spool 31. As soon as the manual rotation of the trip arm 65 is terminated and it is released, the C-shaped spring 61 will restore the trip member 59 in a counter-clockwise direction to the position illustrated in Fig. 4.

The above assembly comprising the trip member 59, the trip housing 60, the spring 61, the washer 63, the sealing ring 64, the trip arm 65 and its assembled pins 66, as an integral unit may now be inserted in the right-hand open end of the cylindrical housing 16 until the periphery shoulders 70 on the trip housing 60 engages the split ring washer 58. Thereafter, the sealing ring 71 is placed around the trip housing 60 against the peripheral shoulder 70 thereon and is held in place by the circumferential washer 72. The trip housing 60, the sealing ring 71 and washer 72 are then secured in place by means of the retaining ring 73 which is of the type that can be compressed sufficiently to insert the same in the end opening in the housing 16, and then released so that it will cooperate with the slot 74 formed on the inner wall of the cylindrical housing 16 adjacent the end thereof. It should be understood that the retaining ring 73 is normally tensioned to expand outwardly into the slot 74 to retain the trip housing and the assembled parts thereon in cooperating relationship with the studs 62 on the outer surface of the rotor 50.

It will be appreciated from the description thus far that all of the parts comprising the mechanism of the present invention, except the transfer switch 76 which will be described hereinafter, are in cooperating relationship so that the mechanism may be moved to its latched position and released therefrom to its unlatched position either electrically or manually. However, before giving a detailed description of the operation of the mechanism of the present invention, the manner in which the transfer switch 76 is mounted thereon will now be described.

As previously described, the cylindrical housing 16 is integrally formed with an upstanding transfer switch housing 17. The latter housing, in conjunction with the cover 75 forms an enclosed cavity communicating with the interior of the cylindrical housing and is provided to house the transfer switch 76. The switch 76 is a separately assembled unit and comprises two parallel upstanding longitudinal plates 77a and 77b, preferably of insulating material, each having six electrical contacts 78a to 78f, inclusive, secured thereto in any desired manner. The plates 77a and 77b are respectively secured to opposite sides of the metal mounting plate 79 by means of rivets 80 or the like, with the terminals of the contact elements 78a to 78f, inclusive, on each of the plates extending in opposite directions. Also included as part of the assembled unit of the transfer switch 76 are two parallel longitudinally movable plates 81a and 81b preferably of insulating material which are slidably mounted respectively on opposite sides of the stationary plates 77a and 77b by means of slots 83 which are slidable on the rivets 84 extending through the plates 77a, 77b and 79, as best shown in Fig. 3. Each of the plates 81a and 81b are provided with two bar-like contact elements 82a and 82b so that each bar-like contact element is normally contacting adjacent stationary contact elements, such as 78a—78b and 78d—78e, as best seen in Fig. 2.

When the movable plate is controlled so that it slides to the left, as seen in Fig. 2, the bar-like contact elements 82a and 82b, on each of the plates, move together to the left to disengage the bar-like contact elements from the stationary contacts 78a and 78d and to engage the adjacent stationary contact elements 78c and 78f. In order to bias the movable plates 81a and 81b so that they move as a unit toward the left, as seen in Fig. 2, to change the movable bar-like contact elements 82a—82b thereon from the illustrated position to the position indicated by the dotted lines, the coil spring 85 is demountably secured at one end to a pin 86 extending between the plates 81a and 81b below the lower edge of the metal plate 79 and the opposite end of the spring 85 is demountably secured in an opening 87 provided in the stationary mounting plate 79. As shown in Fig. 2, the spring 85 is in an extended position because the right edge of the ring 21 on the outer sleeve 20 of the plunger 18 is in engagement with the left edge of the shoulders 88 provided respectively on the movable plates 81a and 81b. In addition to the foregoing, the movable plates 81a and 81b are respectively provided with transversely aligned cam grooves 89 in which the oppositely disposed cam control lugs 54a and 54b on the switch keeper 54 are inserted.

It should be noted that each of the cam grooves 89 includes a first lower slot 89a, a second upper slot 89b and an interconnecting angular slot 89c, so that the keeper 54 will be maintained in the lower position, as illustrated in Fig. 2, while the lugs 54a and 54b are in the first slot 89a and so that the keeper is raised in a vertical direction under control of the interconnecting slot 89c to the second slot 89b as the movable plates 81a and 81b on the transfer switch 76 are moved to the left. The movement of the movable plates 81a and 81b is under control of the solenoid 30 and the keeper 54, as well as the ring 21 on the outer sleeve 20 of the plunger 18. If the solenoid 30 on the coil spool 31 is energized over an electrical circuit, to be described hereinafter, it creates a magnetic flux field which will attract the switch keeper 54 against the central pole piece 29 on the core 27 to hold the keeper in its lower position, as illustrated in Figs. 2 and 3. This will prevent the plates 81a and 81b from being moved to the left (Fig. 2) under control of the spring 85 even though the ring 21 has moved away from the shoulders 88 on the respective plates 81a and 81b. However, as soon as the electrical circuit for the solenoid 30 is interrupted, the magnetic flux field generated thereby will immediately decay to permit the keeper 54 to be lifted in the cam grooves 89 as the plates 81a and 81b move to the left. There is still another means for preventing the keeper 54 from being lifted by the cam grooves 89 and also to prevent the plates 81a and 81b from moving to the left (Fig. 2) after the ring 21 has moved away from the shoulders 88. This means includes the lug 53d on the rotor 50 (Fig. 3).

More specifically, when the rotor 50 rotates in a clockwise direction (Fig. 3) in response to the energization of the solenoid 30, as will be described hereinafter, the lug 53d on the rotor 50 will rotate to a position immediately above the left shoulder 54d on the keeper 54 and will thereby mechanically prevent the keeper 54 from being lifted or moved upwardly. This action will take place even though the energization circuit for the solenoid 30 is interrupted within an extremely short interval of time after its energization circuit is completed. It will be subsequently seen that the rotor 50 will always be rotated sufficiently in the clockwise direction as viewed in Fig. 3 until the stops 52b and 52d thereon engage the cooperating pole pieces 28b and 28d whenever the solenoid 30 has been energized and rotates the rotor 50 and its shaft 41, an angular distance great enough to enable the cam followers 45 and 46 (Fig. 5) to cooperate with the flat cam surfaces 43 and 44 on the cam 40. Thereafter, the rotor 50 will back away from its advanced rotary position described above, as soon as the solenoid 30 is deenergized, under control of the C-shaped spring 57 in order to withdraw the lug 53d from engagement with the shoulder 54d. Thus, the keeper 54 is retained in its lowermost position while the solenoid 30 is energized and it will also be retained in its lowermost position by means of the lug 53d until the rotor 50 backs away from its advanced rotary position. After both of the above events have occurred, the keeper 54 will be lifted in the manner described previously, as the movable plates 81a and 81b move to the left (Fig. 2). As the movable plates 81a and 81b slide or move to the left with respect to the stationary plates 77a and 77b, the bar-like movable contact elements 82a and 82b on the respective movable plates will change the circuit connections between the stationary contact elements 78a to 78f, inclusive.

The assembled transfer switch 76 is removably mounted in the housing 17 by means of oppositely disposed vertical slots 90 formed respectively in the opposite inner end walls of the housing 17 and spaced equal distances between the side walls thereof. The slots 90, as seen in Fig. 2, extend downwardly from the upper edge of the housing 17 a distance which is determined by the extended ends on the metal mounting plates 79 for the transfer switch 76 so that the shoulders 88 on the movable plates 81a and 81b are in a position to engage the end surface on the ring 21 of the outer sleeve 20 on the plunger 18. After the transfer switch 76 is thus mounted in the slots 90 in the housing 17, a gasket 91 is placed upon the upper exposed surface of the housing 79, a soft rubber or other resilient like sheet 92 is placed on the upper edge surfaces of the transfer switch 76, the cover 75 is placed thereon with washers 93 and screws 94 utilized to secure the housing in place. As the screws are driven in place, the resilient sheet 92 will be slightly compressed between the upper edges of the stationary plates 77a and 77b and the under surface of the cover 75. Thus, the cover 75 and the resilient sheet 92 will retain the transfer switch 76 in its mounted position in the slots 90 formed in the inner end walls of the housing 17.

In order to provide the electrical connections to the stationary contact elements 78a to 78f, inclusive, on each of the plates 77a and 77b, and to the winding of the solenoid 30, an opening 95 may be provided in the end walls of the housing 17 and the cover 75 to permit the cable 96, having appropriate wiring therein, to make the electrical connections with the terminals and solenoid winding noted above and an exterior control panel and power source. Although the opening 95 for the cable 96 has been shown at the right end of the housing 17 and cover 75 as seen in Fig. 2, it will be apparent that this opening may be provided in the left end of the transfer switch housing.

An electrical circuit for controlling one or more of the mechanisms of the present invention is shown in Fig. 7, and includes the solenoid 30 of the first mechanism and its associated transfer switch 76, a second mechanism is represented by the solenoid 30A and its transfer switch 76A, and the last mechanism in the series is represented by the solenoid 30B. Any number of such mechanisms may be connected in series to successively control the release of successive bombs by a plurality of bombing release shackles 10, as illustrated in Fig. 1.

If it is assumed that a plurality of bomb release shackles 10 and the associated release mechanism 15 are mounted on an aircraft, or the like, and are wired in accordance with Fig. 7, the bombs carried by the respective shackles 10 may be sequentially controlled by successive actuations of the contacts 99, which is either a thumb operated contact mechanism, under control of the pilot of the aircraft, or is a contact which is automatically controlled by a bomb sight device (not shown). With the release mechanism 15, as illustrated in the drawings in the latched or cocked position and with the electrical wiring connected and arranged as shown in Fig. 7, the closing of the contacts 99 will complete a circuit from the positive terminal by way of the contacts 99, stationary contacts 78e on the plate 77b of the transfer switch 76, movable contact element 82b on the movable plate 81b on the transfer switch 76, contact 78d and the winding of the solenoid 30 to the negative terminal. The positive (+) and negative (−) symbols schematically illustrated represent a source of power. Any voltage may be utilized provided the winding of the solenoid 30 is of appropriate resistance and number of turns, to control the operation of the release mechanism 15. The solenoid 30 will be energized over the above described circuit and will create a magnetic flux which will cause the plunger 18 on the release mechanism 15 to be moved from its latched or cocked position to an unlatched position, but as previously noted, the transfer switch mechanism 76 will delay its movement to the left, as shown in Figs. 2 and 7, until the contacts 99 are again opened to interrupt the energizing circuit for the solenoid 30. With the source of power connected to the mechanism through the cable 96 (Fig. 2) a circuit is normally completed from the positive terminal by way of the contacts 78b, 82a, 78a, the lamp 97 and the negative terminal of the source of power for illuminating the lamp 97 to indicate that the release mechanism 15 is in its latched or cocked position. As soon as the contacts 99 are interrupted to open the circuit for the winding of solenoid 30, the keeper 54 (Fig. 2) will permit the movable plates 81a and 81b to be moved to the left under control of the spring 85, inasmuch as the plunger 18 of the mechanism has moved to its extended, unlatched or uncocked position. When this occurs, the above described circuits for the solenoid 30 and the lamp 97 will be interrupted and new circuits will be prepared for energizing the solenoid 30A of the second release mechanism and the lamp 98 will be illuminated to indicate that the first release mechanism has been actuated to release its bomb. In other words, a circuit will now be completed for illuminating the lamp 98 which includes the negative terminal, lamp 98, stationary contacts 78c, movable contact 82a which is now moved to the left as viewed in Fig. 7, stationary contacts 78b and the ground terminal. The illuminated condition of the lamp 98 will indicate that the bomb release mechanism 15 has been actuated to its unlatched position. Inasmuch as the movable contact 82b has been moved to its left position, it transfers the previously traced circuit including the contacts 99 from the circuit for the first solenoid 30 to a circuit for the second solenoid 30A. It should also be understood that the contacts 78a to 78f, inclusive, on the stationary plate 77a and the movable contacts 82a and 82b on the movable plate 81a on each of the release mechanisms may be utilized for controlling any other desired circuits (not shown).

The next time the contacts 99 are closed, inasmuch as the first transfer switch 76 has been moved to transfer the circuit, the second solenoid 30A will be energized over a circuit including the positive terminal, contacts 99, 78e, 82b, 78f, the closed contacts on the transfer switch 76A of the second release mechanism and the winding of the solenoid 30A on the second release mechanism to the negative terminal. Thus, the second solenoid 30A is energized to cause the second release mechanism to actuate its bomb shackle. As soon as the contacts 99 are opened, the transfer switch 76A of the second release mechanism will be moved to the left as viewed in Fig. 7 to again transfer the circuits to the next bomb shackle release in the series. It should be noted that each transfer switch for each of the release mechanisms is provided with circuits for illuminating a lamp, such as 97, 97A, etc. to indicate whether or not the corresponding release mechanism is in its latched or cocked position and after the corresponding transfer switch 76, 76A, etc. is actuated, the corresponding lamps 98, 98A, etc. will be illuminated to indicate that the corresponding release mechanism has moved to its unlatched or uncocked position. Thus, the pilot of the aircraft, or the like, will have a visual signal to indicate the number of bomb shackles that have been actuated to release the associated bomb and also the number of bomb shackle mechanisms that are still loaded with an associated bomb.

The detailed operations of the mechanism disclosed in the drawings will now be described in conjunction with the above electrical circuit as illustrated in Fig. 7. For this purpose, it will be assumed that the mechanism of Fig. 2 is in its latched or cocked position. When the external contacts 99 are closed, as described above, to complete the energizing circuit for the winding of the solenoid 30, a magnetic flux field is created between the central pole piece 29, which is of one polarity, and the spaced-apart circumferential pole pieces 28a to 28d, inclusive, which will be of the opposite polarity. Since the rotor 50 having the spaced-apart pole pieces 51a to 51d is in the magnetic field of the opposite polarities on the pole pieces 28a to 28d, inclusive, and the central pole piece 29, the rotor 50 will rotate in a clockwise direction as seen in Fig. 3 to align its respective pole pieces 51a to 51d, inclusive, with the stationary pole pieces 28a to 28d, inclusive. Since the rotor 50 would normally have a tendency in rotating in its clockwise direction against the tension of the C-shaped spring 57 to override the alignment position between the respective pole pieces, the stops 52b and 52d have been provided on the rotor 50 to stop the rotation thereof as soon as the above mentioned stops engage the associated pole pieces 28b and 28d. These stops 52b and 52d also provide additional magnetic flux paths to hold the rotor 50 in its rotated or trapped position until the circuit of the coil 30 is interrupted.

The energization of the coil 30 in creating the magnetic flux field in the central pole piece 29, attracts the keeper 54 to prevent it from moving upwardly from the position illustrated in Fig. 3. In addition thereto, as soon as the lug 53d on the rotor 50 moves to a position to overlie the left shoulder 54d on the keeper 54, it will also prevent the keeper from moving upwardly even though the magnetic flux field no longer attracts the keeper 54 to the central pole piece 29.

The rotation of the rotor 50 also causes the rotation of the shaft 41, to which it is rigidly secured, and since the shaft extends completely through the central core 27 it also rotates the cam 40 at the opposite end of the shaft 41 in a clockwise direction as seen in Fig. 5 of the drawings. Normally, in its illustrated position, the cam 40 is arranged so that the oppositely disposed high points on the surface thereof retain the oppositely disposed latch members 33 and 34 in the position shown in Fig. 5 so that the cooperating angular surfaces 38 on the latches 33 and 34 and the inner circumferential wall of the plunger 18 will prevent the plunger from being forced to the left as seen in Fig. 2 under control of the heavy compression spring 23. As the rotor 50 begins to rotate and moves the shaft 41, the high points on the cam 40 will be rotated a few degrees until the angular cam follower surfaces 45 and 46 on the respective latch members 33 and 34 engage the oppositely disposed flat cam surfaces 43 and 44 on the cam 40. Although the magnetic flux field created by the energization of the solenoid 30 will cause the rotor 50 to rotate from its normal position to its advance rotary position with the stops 52b and 52d thereon into engagement with the pole pieces 28b and 28d, it should be understood that this rotary action is considerably enhanced by the action of the cam follower surfaces 45 and 46 against the flat cam surfaces 43 and 44 because the latch members 33 and 34 are being forced toward each other under control of the pressure exerted by the heavy compression spring 23 against the angular surfaces 38 on the respective latch members 33 and 34. The outward pressure thus exerted will compress the latch members 33 and 34 toward each other and the cooperating cam surfaces noted above will further rotate the cam 40, its shaft 41 and the rotor 50 in the clockwise direction as seen in Fig. 5 even though the energizing circuit for the solenoid 30 has been interrupted.

The angle of the angular surface 38 is approximately five degrees so that it is apparent that as long as the latch members 33 and 34 are held in their outward positions by the high surfaces on the cam 40, the plunger 18 will be prevented from moving to its extended position, but as soon as the cam 40 rotates sufficiently to release the outward pressure between the latches 33 and 34, then the compressed spring 23 will force the plunger 18 to the left as viewed in Fig. 2 against the angular surface 38 to further reduce the distance between the two latch members 33 and 34. Also, the action of pressing the latch members toward each other cause the cam surfaces 45 and 46 to act against the flat cam surfaces 43 and 44 to further rotate the cam 40 and the shaft 41. As soon as the latch portions on the respective latch member 33 and 34 are released from the angular surface 38, the compressed spring 23 will force the plunger 18 outwardly to the left. The longitudinal inner wall of the inner sleeve 19 on the plunger 18 is provided with slots 19a to clear the latch members 33 and 34 as the plunger moves outwardly and co-act with the central core 27 to prevent the plunger 18 from rotating with respect to the central core 27.

The movement of the plunger 18 to the left is with considerable speed due to the relatively high pressure of the spring 23 and in prior devices the outer shoulder 26 on the housing 16 was sometimes badly distorted. However, in the present invention, the felt ring 25 and the split steel ring 24 function as a brake mechanism when the angular circumferential surface 22 on the ring 21 of the outer sleeve 20 of the plunger 18 engages the cooperating angular surface 24b on the split ring 24. The braking action of the ring 24 and its felt washer 25 is brought about by the angular surface 24b thereon tending to further expand the ring 24 in its groove 24a. The braking thus obtained by the rings 24 and 25 in cooperation with the groove 24a and the angular surfaces 22 and 24b, will quickly, but without shock, bring the plunger 18 to a stop position without putting any objectionable strain on the shoulder 26 on the housing 16. In fact, the housing may now be made of aluminum whereas in prior devices it was necessary to make it of relatively hard steel. It should be noted that as soon as the ring 21 on the plunger 18 moves away from the shoulders 88 on the respective movable plates 81a and 81b on the transfer switch 76, the spring 85 will normally tend to move the movable plates from the right-hand positions to the left-hand positions in order to transfer the electrical circuits through the contacts thereon. However, the movement of the plates noted above can not take place until the energizing circuit for the coil 30 has been interrupted, for example, by the contacts 99 or if the circuit has previously been interrupted, the plates can not be moved until the keeper 54 is released by the lug 53d on the rotor 50.

It will now be assumed that the solenoid coil 30 is still in its energized condition and, accordingly, the keeper 54 will be held against the central pole piece 29 by magnetic attraction and also by the lug 53d which is held in position in engagement with the shoulder 54d on the keeper 54, as long as the rotor 50 has its pole pieces 51a to 51d, inclusive, in alignment with the stator pole pieces 28a to 28d, inclusive. If the circuit for the solenoid 30 is now interrupted by the opening of the contacts 99, the magnetic flux field created by the solenoid 30 will immediately decay and will permit the spring 57 to rotate the rotor 50 in a counter-clockwise direction, as seen in Fig. 3. However, the spring 57 can not fully restore the rotor 50 due to the fact that the flat surfaces 43 and 44 on the cam 40 will engage the co-acting surfaces 45 and 46 on the latch members 33 and 34. Although these cam surfaces cooperate in attempting to move the latch members outwardly to assist the latch spring 37 to the normal latching positions, the outward movement is retarded by the wall of the slots 19a formed in the inner sleeve 19 of the plunger 18. The counter-clockwise rotation of the rotor 50 is sufficient, however, to withdraw the lug 53d from the locking position above the shoulder 54d on the keeper 54. Also, the decay of the magnetic flux field upon the deenergization of the solenoid 30 will release the keeper 54 so that it can be raised in its cooperating slot in the spool head of the coil spool 31.

More specifically, since the keeper 54 is now fully released and the ring 21 on the sleeve 20 of the plunger 18 has been withdrawn from the shoulders 88 on the movable plates 81a and 81b, the spring 85 will now function to move the plates 81a and 81b in their slots 83 to the left as viewed in Fig. 2 to transfer the circuits through the contacts 78a to 78f, inclusive, and the contacts 82a and 82b on the respective movable plates 81b and 81a in the manner previously described. As the plates 81a and 81b are moved to the left, the cam control lugs 54a and 54b on the keeper 54 will ride in the slots 89 from the lower slot 89a up the inner connecting angular slot 89c to the upper slot 89b thus raising the keeper 54 in a vertical direction. Thus, the actual transferring of the circuits through the contacts of the transfer switch 76 can not take place until the circuit to the solenoid 30 has been interrupted by the external contacts 99, because the keeper 54 is held in its lower-most position. On the other hand, if the solenoid energizing circuit is interrupted to eliminate the magnetic flux field, the keeper 54 will instead be held in its lower-most position by the lug 53d on the rotor 50. The counter-clockwise rotation of the rotor 50 to withdraw the lug 53d from the shoulder 54d on the keeper will occur as a result of the decay of the magnetic flux upon the deenergization of the solenoid 30 or, if the circuit has already been interrupted, then the keeper 54 will be released by the spring 57 partially restoring the rotor 50 in its counterclockwise direction sufficiently to withdraw the lug 53d from the shoulder 54d. As is previously described in connection with the circuit arrangement illustrated in Fig. 7, the next closure of the contacts 99 will now complete the circuit for the second release mechanism solenoid 30A inasmuch as the transfer switch 76 of the first release mechanism has been actuated.

In order to fully restore the rotor 50 to its original position, it is now necessary to return the plunger 18 to the position illustrated in Fig. 2. This may be done by an inwardly directed axial force exerted manually, or otherwise, on the outer left-hand end of the plunger 18. As the plunger 18 is forced inwardly, the spring 23 is compressed and when the angular surface 38 on the plunger 18 reaches the cooperating angular surface on the respective latch members 33 and 34, the latch spring 37 will move the latch members 33 and 34 away from each other to latch the plunger 18 in the illustrated position. As soon as the latch members are moved away from each other to the latching position, the C-shaped spring 57 on the rotor 50 will rotate the rotor in a counter-clockwise direction to the position illustrated in Fig. 3. It being understood that the high points on the cam 40 will hold the latch members 33 and 34 in their expanded positions to mechanically hold the plunger 18 in its latched position. The external inwardly directed axial force may now be removed inasmuch as the plunger is restored to its latched position.

Incident to the movement of the plunger 18 toward its latched position, the ring 21 on the outer sleeve 20 on the plunger 18 will engage the shoulders 88 on the respective movable plates 81a and 81b and will move the respective plates, against the tension of the spring 85, in the slots 83 to the right as shown in Fig. 2, to the illustrated position. During this movement, the cam control lugs 54a and 54b on the keeper 54 will be controlled by the cam grooves 89 to move the keeper 54 downwardly to the position illustrated in Fig. 3. All of the parts comprising the release mechanism 15 are now restored to their latched positions so that they may again be controlled to move to the unlatched position under control of the compression spring 23 when the mechanism is again released.

In the previous description, the release of the mechanism was accomplished by completing an electrical circuit to the winding of the solenoid 30. However, it is necessary in the event of circuit failure to provide some means whereby the mechanism may be otherwise released. For example, if the electrical circuit fails and can not control the release of the mechanism 15, it is advisable to provide an alternative release control so that the bombs may be disposed of without endangering the pilot and other personnel on the ground or the aircraft carrier when the plane returns to its base. The mechanism of the present invention is provided with a positive manual release device which accomplishes the same control of the release mechanism as though the solenoid thereof is electrically energized. While it has been assumed that the mechanism of the present invention is used to control the release of a bomb, it should be understood that it may be used in any place where it is desirable to release a relatively large amount of stored energy in an extremely short interval of time, in response to the control of the mechanism by a relatively small amount of energy.

The manual or auxiliary control of the release of the mechanism will now be described, but it should be understood that the auxiliary control of the release could be accomplished by many other means, including, for example, an explosive bellows, a bimetallic strip, a fuseable link, or the like.

In Fig. 2 the pins 66 shown at the right and extend outwardly a short distance in the trip housing 60 and they are respectively secured to oppositely extending arms on the trip arm 65. Since the trip arm is rigidly secured to the rotatable trip member 59, the manual rotation of the trip arm 65 will cause the rotation of the rotor 50 in substantially the same manner as though it is rotated by the magnetic field created by the energized solenoid 30. The pins 66 on the trip arm 65 may, of course, be used to turn the trip arm 65 by the thumb and finger of an operator or they may be connected by means of a flexible cable to a position that is readily available to the pilot or other member of the airplane. When the trip arm is rotated in a counter-clockwise direction, as seen in Fig. 6, clockwise direction as seen in Fig. 4, the trip member 59 will engage the studs 62 on the rotor 50 and will thereby cause rotation of the rotor in a clockwise direction as seen in Fig. 3. Thus, the rotor 50 and its shaft 41 may be manually rotated approximately 35 degrees but actually it is not necessary to manually rotate the rotor 50 more than approximately 12 degrees because as soon as the latter amount of rotation takes place, the cam surfaces 43 to 46, inclusive, will cooperate in the manner previously described to thereafter control further rotation of the rotor 50. In other words, the pressure exerted upon the latch members 33 and 34 by the angular surface 38 on the plunger 18 will force the latch members toward each other and against the cam surfaces 43 to 46 to complete the rotation of the shaft 41 and rotor 50.

The manually actuated trip arm 65 may be released as soon as it has been rotated approximately 12 degrees and the C-shaped spring 61 will immediately function to restore the trip member 59 and trip arm 65 to their initial positions, as illustrated in Figs. 4 and 6. Further operation of the release mechanism 15 as the result of the momentary actuation of the trip arm 65 is exactly the same as has been previously described in connection with the electrical actuation of the release mechanism 15.

The mechanism is substantially sealed by means of the sealing rings 64 and 71 which may be rubber or silicon rings having a cylindrical cross-section and they act as cushions between the trip housing 60 and the main body of the cylindrical housing 16 and between the trip housing 60 and the shaft on the trip member 59. In this connection, it should be noted that the felt ring 25 provided between the outer sleeve 20 of the plunger 19 and the cylindrical housing 16 also acts as a sealer to prevent moisture, dirt, etc., from entering the interior of the mechanism.

The release mechanism of the present invention is somewhat smaller and lighter in weight than prior known release mechanisms and it is capable of storing a greater amount of releasable energy than the prior devices. It will be understood that the amount of stored energy may be either increased or decreased depending upon the amount of work that is required. Furthermore, the present mechanism will withstand all of the severe shock tests and fatigue tests that have heretofore rendered known release mechanisms inoperative and is sufficiently shockproof to prevent inadvertent release of the mechanism under severe shock conditions.

While there has been described what is at present considered to be the preferred embodiment of the invention, it will be understood that various modifications may be made therein which fall within the true spirit and scope of the invention.

What is claimed is:

1. A shockproof energy storing and release mechanism comprising, a housing having a hollow longitudinally movable plunger, locking means supported within the interior of said hollow plunger, said locking means having a locking position in engagement with an interior surface of said plunger for retaining said plunger in a cocked energy storing position and having an unlocking position releasing said plunger from said cocked position, a rotatable cam cooperating with said locking means having a first position holding said locking means in said locking position and movable to a second position to release said locking means and permit movement thereof from its said locking position to said unlocking position, means selectively controllable to rotate said cam from said first position to said second position, and energy storing spring means carried by said plunger effective in response to said release of said locking means for controlling said plunger to quickly move said locking means to its said unlocking position as said spring means expends its stored energy by longitudinally moving said plunger from said cocked position.

2. The mechanism set forth in claim 1, wherein said locking means includes a plurality of circumferentially spaced-apart latch members, latch spring means biasing said latch members outwardly to said locking position, and wherein said locking means is moved from said locking position to said unlocking position against the biasing force of said latch spring means.

3. The mechanism set forth in claim 1, including a solenoid supported in said housing concentric with said cam rotating means and longitudinally disposed with respect to said plunger, and a rotor secured to said cam rotating means actuated by energization of said solenoid to selectively control said cam rotating means in order to rotate said cam from said first position to said second position.

4. The mechanism set forth in claim 1, including a rotatable trip arm supported in said housing concentric with said cam rotating means and longitudinally disposed with respect to said plunger, and means secured to said rotatable trip arm effective in response to rotation of said trip arm to selectively control said cam rotating means in order to rotate said cam from said first position to said second position.

5. The mechanism set forth in claim 1, including a solenoid in said housing concentric with said cam rotating means and longitudinally disposed with respect to said plunger, a rotatable trip arm supported in said housing concentric with said cam rotating means and longitudinally disposed with respect to said plunger, a rotor secured to said cam rotating means actuated either by energization of said solenoid or by rotation of said trip arm to selectively control said cam rotating means in order to rotate said cam from said first position to said second position.

6. The mechanism set forth in claim 3, including a central core supporting said solenoid thereon to form a first central pole piece and having a plurality of arms thereon extending parallel to said core and forming a plurality of circumferentially spaced-apart second pole pieces so that energization of said solenoid creates a magnetic flux field of a first polarity at said first central pole piece and a magnetic flux field of a second polarity at said second pole pieces, and wherein said rotor is positioned with respect to said first pole piece and said second pole pieces to rotate a predetermined angle of rotation in response to said magnetic flux fields of said first and second polarities.

7. The mechanism set forth in claim 6, wherein said central core pivotally supports said locking means for pivotal movement between said locking and said unlocking positions and guides said plunger during longitudinal movement thereof from said cocked position.

8. The release mechanism set forth in claim 1, including a central core, wherein said plunger includes an inner sleeve slidably mounting said plunger for longitudinal movement on said core and an outer sleeve circumferentially spaced-part from said inner sleeve to form therebetween a cylindrical cavity to house said energy storing spring means therein.

9. The release mechanism set forth in claim 8, wherein said outer sleeve on said plunger forms a cylindrical bearing for slidably mounting said plunger for longitudinal movement with respect to said housing, a stop ring formed around the periphery of one end of said outer sleeve, stop means formed in one end of said housing to terminate said longitudinal movement of said plunger from said cocked position, said stop means in said housing including an expandable ring supported between said housing and said outer sleeve in a position to be engaged by said stop ring, said expandable ring acting as a friction brake in response to engagement thereof by said stop ring during said longitudinal movement of said plunger from said cocked position by expanding outwardly against the inner surface of said housing to quickly terminate said longitudinal movement of said plunger with respect to said housing.

10. The release mechanism set forth in claim 8, wherein said housing includes an end shoulder forming a collar surrounding said outer sleeve on said plunger, an expandable ring normally surrounding said outer sleeve of said plunger and restrained against longitudinal movement with respect to said plunger by a circumferential groove formed in the inner surface of said housing adjacent said collar, an outwardly protruding stop ring circumferentially formed around the peripheral surface of said outer sleeve adjacent one end thereof, and surfaces on said expandable ring and said stop ring cooperating in response to engagement thereof as a result of said longitudinal movement of said plunger from said cocked position for expanding said expandable ring outwardly into said groove so that said expandable ring co-acts with said housing as a friction brake to terminate said longitudinal movement of said plunger and thereby substantially preventing the shock of stopping said movement of said plunger from being transmitted to said collar on said housing.

11. An energy storing and release mechanism comprising, a spring loaded hollow plunger, pivoted latch members supported within the interior of said plunger biased outwardly to a latching position to retain said plunger in latched position against the tension of said spring and movable to an unlatching position against said bias, a cam positioned between said latch members and movable from a first position to a second position, said cam in said first position mechanically holding said latch members in said latching position and movable to a second position to permit said latch members to be pivoted toward an unlatched position, a shaft concentric with said plunger secured to said cam, and means for rotating said shaft a predetermined distance to move said cam from said first position to said second position to unlatch said latch members, said plunger in response to said movement of said cam from said first position being released from said latched position to move toward an unlatched position and simultaneously moves said biased pivoted latch members toward each other to an unlatching position.

12. An energy storing and release mechanism comprising, a spring loaded hollow plunger, pivoted latch members supported within said plunger and biased outwardly to a latching position to retain said plunger in latched position against the tension of said spring and movable to an unlatched position against said bias, a cam positioned between said latch members and movable from a first position through a second position to a third position, said cam in said first position mechanically holding said latch members in said latching position and movable to a second position to permit said latch members to be pivoted toward said unlatched positions, a shaft concentric with said plunger secured at one end to said cam, a rotor secured to the opposite end of said shaft, and means for rotating said rotor a first distance to move said cam from said first position to said second position to unlatch said plunger, said plunger in response to said movement of said cam to said second position being released from said latched position moves to an unlatched position and simultaneously reacts to move said biased pivoted latch members toward each other to move said cam from said second position to said third position.

13. An energy storing and release mechanism comprising, a housing, a tubular plunger having a closed end and an open end longitudinally movable from a cocked position in said housing to a predetermined extended uncocked position, locking means supported within said plunger adjacent said closed end thereof for retaining said plunger in said cocked position, a coil winding supported in said housing longitudinally of the open end of said plunger energizable by an electrical impulse to generate a magnetic flux field, a rotor positioned coaxial with said plunger and longitudinally of said open end thereof and rotatably actuated by said magnetic flux field for releasing said locking means from said locked position, a load spring in said plunger effective in response to said release of said locking means from said locking position to move said plunger longitudinally with respect to said housing from said cocked position toward said predetermined extended uncocked position, and brake means cooperating between said plunger and said housing for frictionally retarding said longitudinal movement just prior to said plunger reaching said extended uncocked position.

14. The mechanism set forth in claim 13, including a transfer switch mounted in said housing comprising a first stationary plate supporting a plurality of contacts, a movable second plate supporting a plurality of contacts longitudinally movable with respect to said first plate from a first position to a second position to switch circuits through different sets of stationary contacts on said first plate, means on said plunger in said cocked position mechanically retaining said second plate in said first position until said plunger is released from said cocked position, a keeper carried by said second plate normally in a first position and movable to a second position in response to longitudinal movement of said second plate from its first position to its second position, said keeper in response to said generated magnetic flux field being held in its normal first position to preventing longitudinal movement of said movable second plate even though said plunger and said means thereon is released from said cocked position by said rotation of said rotor, and said keeper permitting longitudinal movement of said second plate from its first position to its second position as soon as magnetic flux field decays in response to the termination of said electrical impulse.

15. The mechanism set forth in claim 14, wherein said rotor is rotated a predetermined angle of rotation in response to said magnetic flux field generated by energization of said coil winding and remains in said predetermined rotary position until said magnetic flux field decays in response to deenergization of said coil winding, means for mechanically rotating said rotor to said predetermined position in the event said deenergization of said coil winding occurs before said rotor reaches said predetermined rotary position, and means on said rotor for holding said keeper in said normal first position as long as said rotor remains in said predetermined rotary position, and a restoring spring for withdrawing said rotor from said predetermined position to release said keeper to permit movement thereof to said second position.

16. The mechanism set forth in claim 15, wherein said rotor restoring spring withdraws said rotor from said predetermined rotary position to release said keeper for movement from said normal first position to said second position either in response to said decay of said magnetic flux field by deenergization of said coil winding or in response to said mechanical rotation of said rotor into said predetermined rotary position depending upon the event last to occur.

17. An energy storing and energy release mechanism, comprising, a housing, a spring in said housing having an energy storing position and an energy release position, a longitudinally extending tubular plunger mounted for longitudinal movement in said housing between a first position retaining said spring in said energy storing position and a second position releasing said spring to expend its stored energy, a shoulder carried by said plunger, a latch disposed within said plunger and selectively movable into and out of latching engagement with said shoulder, a cam having a set position holding said latch in latching engagement with said shoulder and a release position accommodating movement of said latch out of latching engagement with said shoulder, means for selectively moving said cam from its set position into its release position, said latch being of the quick-release type so that it is immediately moved out of latching engagement with said shoulder in response to only slight movement of said cam from its set position toward its release position, said movement of said latch out of said latching engagement with said shoulder being controlled by said spring moving said plunger from said first position toward said second position.

18. An energy storing and energy release mechanism comprising, a housing, a spring in said housing having an energy storing position and an energy release position, a longitudinally extending tubular plunger mounted for longitudinal movement in said housing between a first position retaining said spring in said energy storing position and a second position releasing said spring to expend its stored energy, a shoulder carried by said plunger, a latch disposed within said plunger and selectively movable into and out of latching engagement with said shoulder, a cam having a set position holding said latch in latching engagement with said shoulder and a release position accommodating movement of said latch out of latching engagement with said shoulder, means for selectively moving said cam from its set position into its release position, said latch of the quick-release type includes a first tapered latch surface normally engaging a second tapered latch surface forming said shoulder carried by said plunger so that said first latch surface is immediately moved out of complete engagement with said second latch surface in response to only slight movement of said cam from its set position toward its release position, said movement of said latch out of said latching engagement with said shoulder being controlled by said spring moving said plunger from said first position toward said second position.

19. The mechanism set forth in claim 18, wherein said latch surfaces taper in the direction of longitudinal movement of said plunger at an acute angle to the longitudinal axis of said plunger.

20. The mechanism set forth in claim 19, wherein said acute angle is about 85 degrees.

21. A shockproof energy storing and release mechanism comprising, a housing having a longitudinally movable plunger, locking means supported within said plunger normally having a locking position to retain said plunger in a cocked energy storing position and releasable to an unlocking position to release said plunger from said cocked position in said housing, and a rotatable cam cooperating with said locking means having a first position to hold said locking means in said locking position and movable to a second position to release said locking means so that it may be moved from said locking position to said unlocking position.

References Cited in the file of this patent

UNITED STATES PATENTS

| 2,362,210 | Markey | Nov. 7, 1944 |
| 2,416,028 | Sloan | Feb. 18, 1947 |
| 2,473,597 | Leland | June 21, 1949 |
| 2,535,095 | Schwartz et al. | Dec. 26, 1950 |